US012632302B2

(12) United States Patent
Jung et al.

(10) Patent No.: US 12,632,302 B2
(45) Date of Patent: May 19, 2026

(54) METHOD AND APPARATUS FOR GNN-ACCELERATION FOR EFFICIENT PARALLEL PROCESSING OF MASSIVE DATASETS

(71) Applicant: KOREA ADVANCED INSTITUTE OF SCIENCE AND TECHNOLOGY, Daejeon (KR)

(72) Inventors: Myoungsoo Jung, Daejeon (KR); Junhyeok Jang, Daejeon (KR); Miryeong Kwon, Daejeon (KR); Donghyun Gouk, Daejeon (KR); Hanyeoreum Bae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 602 days.

(21) Appl. No.: 18/166,685

(22) Filed: Feb. 9, 2023

(65) Prior Publication Data

US 2023/0418673 A1 Dec. 28, 2023

(30) Foreign Application Priority Data

Jun. 10, 2022 (KR) ........................ 10-2022-0070822

(51) Int. Cl.
G06F 9/50 (2006.01)
G06F 9/48 (2006.01)
(Continued)

(52) U.S. Cl.
CPC .......... *G06F 9/5027* (2013.01); *G06F 9/4881* (2013.01); *G06F 9/5038* (2013.01);
(Continued)

(58) Field of Classification Search
None
See application file for complete search history.

(56) References Cited

U.S. PATENT DOCUMENTS 11,886,993 B2 * 1/2024 Qi .......................... G06N 3/047
2017/0083824 A1 * 3/2017 Miyakoshi ................ G06F 8/35
(Continued)

FOREIGN PATENT DOCUMENTS

KR 10-2021-0024751 A 3/2021

OTHER PUBLICATIONS

Khorasani et al., "CuSha: Vertex-Centric Graph Processing on GPUs", HPDC'14, Jun. 26, 2014 (37 pages total).
(Continued)

*Primary Examiner* — Abu Zar Ghaffari
(74) *Attorney, Agent, or Firm* — Sughrue Mion, PLLC

(57) ABSTRACT

Provided is an apparatus including a streaming multiprocess scheduler and a computation unit, wherein the streaming multiprocess scheduler obtains a subgraph and an embedding table per layer, determines a number of SMs to be allocated for processing embeddings of a destination-vertex based on a feature dimension and a maximum number of threads in each of the SMs, and allocates the determined number of SMs to each of all destination-vertices included in the subgraph, and the computation unit obtains, by each of the SMs, embeddings of a destination-vertex allocated to each SM, obtains, by each SM, embeddings of at least one or more neighbor-vertices of the destination-vertex using the subgraph, and performs, by each SM, a user-designated operation using the embeddings of the destination-vertex and the embeddings of the neighbor-vertices.

17 Claims, 19 Drawing Sheets

(51) Int. Cl.

| | |
|---|---|
| *G06F 9/54* | (2006.01) |
| *G06F 17/16* | (2006.01) |
| *G06N 3/045* | (2023.01) |
| *G06N 3/0464* | (2023.01) |
| *G06N 3/084* | (2023.01) |

(52) U.S. Cl.
CPC .............. *G06F 9/5066* (2013.01); *G06F 9/54* (2013.01); *G06F 17/16* (2013.01); *G06N 3/045* (2023.01); *G06N 3/0464* (2023.01); *G06N 3/084* (2013.01); *G06F 2209/5017* (2013.01)

(56) References Cited

U.S. PATENT DOCUMENTS

| | | |
|---|---|---|
| 2019/0095806 A1* | 3/2019 | Martinez Canedo ... G06F 18/21 |
| 2021/0064661 A1 | 3/2021 | Jung et al. |
| 2022/0180201 A1* | 6/2022 | Sarshogh ............... G06N 3/084 |
| 2022/0207343 A1* | 6/2022 | Lei .................... G06F 16/24526 |
| 2022/0343145 A1* | 10/2022 | Xue ........................ G06F 17/16 |

OTHER PUBLICATIONS

Wang et al., "FlexGraph: A Flexible and Efficient Distributed Framework for GNN Training", EuroSys '21, Apr. 26-28, 2021 (16 pages total).
Dai et al., "GraphH: A Processing-in-Memory Architecture for Large-scale Graph Processing", IEEE Transactions on Computer-Aided Design of Integrated Circuits and Systems, 2018, pp. 1-14.
Communication issued Feb. 21, 2025 in Korean Application No. 10-2022-0070822.

\* cited by examiner

```
1   multiNGCF (nLayers, multiCSR, embed) :
2      # parameters for NGCF
3      mode_f, mode_g, mode_h = "mean" , "element −
4      wise product",  "sum"
5      for ℓ in range (1, nLayers+1) :
6        CSR = multiCSR [ℓ−1]
7        edge=NeighborApply (CSR, embed, mode_f)
8        aggr=Pull (CSR, embed, edge, mode_g, mode_h)
9        embed=Apply (aggr)
10     return  embed
```

METHOD AND APPARATUS FOR GNN-ACCELERATION FOR EFFICIENT PARALLEL PROCESSING OF MASSIVE DATASETS

CROSS-REFERENCE TO RELATED APPLICATIONS

This application is based on and claims priority to Korean Patent Application No. 10-2022-0070822, filed Jun. 10, 2022, the disclosures of which are incorporated by reference herein in their entirety.

TECHNICAL FIELD

The present disclosure in some embodiments relates to a graph neural network (GNN) acceleration method and a GNN acceleration apparatus. More particularly, the present disclosure relates to a method and an apparatus for GNN acceleration for efficient parallel processing of massive graph dataset.

BACKGROUND

The statements in this section merely provide background information related to the present disclosure and do not necessarily constitute prior art.

Graph neural networks (GNNs) are being paid significant attention and widely adopted in various learning tasks to take advantage of the power of graphs. GNNs are used in variety of computing systems such as recommender systems, social networks, natural sciences, knowledge graphs, etc.

Typically, graph-based analyses and graph embeddings are considered heavy and time-consuming tasks since they require processing all nodes of a target graph. In contrast, GNNs can simply infer results using local graph connections for a given set of nodes by leveraging learning processes of traditional neural networks such as convolutional neural networks (CNNs). GNNs can in turn make the graph-based analyses deliver ground-breaking performance and high interpretability.

Meanwhile, their graph-natured data processing makes a difference between GNNs and the existing neural networks. For example, GNNs aggregate multiple node feature vectors (i.e., embeddings), which require traversing a target graph and processing a set of variables with sparse data. To bridge the semantic gap, several studies extend programming abilities of deep learning (DL) frameworks, such as TensorFlow and PyTorch. For the node aggregation, edge-centric operations of the extension introduce lock and synchronization overhead, which significantly degrades overall performance. To address this, a few emerging GNN frameworks have recently applied a vertex-centric data processing to GNN computing.

Despite these efforts, the emerging GNN frameworks yet suffer from low data processing performance on GNN computing due to three root causes. First, these partially vertex-centric operations make memory and cache management inefficient thereby limiting the scalability of parallel data processing in CPUs. Second, the GNN extension frameworks aggregate node embeddings first and then simply transform the aggregated node embeddings using a multi-layer perceptron (MLP) in default. This static kernel scheduling is unaware of the dimensionality reduction for node embeddings, which are crucial to reducing the computation and memory requirements (thereby shortening the execution times). Finally, all the existing GNN frameworks overlook the long latency imposed by GNN-specific preprocessing, even though it is a per-service task that sits on the critical path in GNN computing. The present inventors have observed that the latency of preprocessing for large-scale graphs accounts for an average of 81.7% of the total GNN processing time.

Thus, to support the efficient parallel processing of neural networks for massive graphs, there is a need for i) pure vertex-centric GNN computing, ii) dynamic kernel placement, and iii) end-to-end latency reduction.

SUMMARY

The present disclosure aims to comprehensively support efficient parallel computation of neural networks for processing massive graphs. To this end, the present disclosure performs a GNN computation in parallel by allocating a destination-vertex-centric streaming multiprocessor (SM) and scheduling a plurality of threads in the SM in a feature-wise manner, considering the characteristics of the graph.

To further reduce runtime and the size of the tensor to be processed by the GNN, the present disclosure performs a dynamic kernel placement by using a cost model that approximates the kernel runtime based on the dimensionality of the input tensor and performs in advance a graph conversion for backward propagation (BWP) computations by using host resources.

For efficient graph data preprocessing from the perspective of an end-to-end execution, the present disclosure performs dividing the preprocessing task into multiple subtasks considering layers, data types, dependencies, contention for access to shared resources, and the like, and performs scheduling the subtasks to be each executed in parallel by using multiple threads.

Unrestricted to those aspects set forth herein, the present disclosure has other aspects that will become more apparent to one of ordinary skill in the art to which the present disclosure pertains from the detailed description of the present disclosure as follows.

According to at least one embodiment, the present disclosure provides a method for accelerating a graph neural network for efficient parallel processing of massive graph datasets, including obtaining a subgraph and an embedding table per layer, determining a number of streaming multiprocessors (SMs) to be allocated for processing embeddings of a destination-vertex based on a feature dimension and a maximum number of threads in each of the SMs, allocating a determined number of SMs to each of all destination-vertices included in the subgraph, obtaining, by each of the SMs, embeddings of a destination-vertex allocated to each SM, obtaining, by each SM, embeddings of at least one or more neighbor-vertices of the destination-vertex using the subgraph, and performing, by each SM, a user-designated operation using the embeddings of the destination-vertex and the embeddings of the neighbor-vertices.

According to another embodiment, the present disclosure provides an apparatus for accelerating a graph neural network for efficient parallel processing of massive graph datasets, including a streaming multiprocess scheduler and a computation unit. The streaming multiprocess scheduler is configured to obtain a subgraph and an embedding table per layer, to determine a number of SMs to be assigned for processing embeddings of a destination-vertex based on a feature dimension and a maximum number of threads in each of the SMs, and to allocate a determined number of SMs to each of all destination-vertices included in the subgraph. The computation unit is configured to obtain, by each of the SMs, embeddings of a destination-vertex allocated to each SM, to obtain, by each SM, embeddings of at least one or more neighbor-vertices of the destination-vertex using the subgraph, and to perform, by each SM, a user-designated operation using embeddings of the destination-vertex and the embeddings of the neighbor-vertices.

According to embodiments of the present disclosure, GNN computation is performed in parallel by allocating a destination-vertex-centric SM and scheduling a plurality of threads in the SM in a feature-wise manner, thereby eliminating memory bloat and cache bloat in a graphic processing unit (GPU).

According to embodiments of the present disclosure, the runtime of the GNN can be further reduced by performing dynamic relocation of the GNN kernel by using a cost model that approximates the kernel runtime based on the dimensionality of the input tensor, and by performing graph format conversion for backward propagation operations in advance by using host resources.

According to embodiments of the present disclosure, service-wide latency can be significantly reduced by dividing the preprocessing process into multiple subtasks by considering layers, data types, dependencies, contention for access to shared resources, etc., and then scheduling the respective subtasks to be executed in parallel by using multiple threads.

According to embodiments of the present disclosure, the memory consumption required to execute a graph neural network can be reduced to enable execution of the graph neural network by utilizing an accelerator (GPU) with low-capacity memory, thereby reducing the cost of building the system.

BRIEF DESCRIPTION OF THE DRAWINGS

FIGS. 6A, 6B, 6C, and 6D illustrate a streaming multiprocessor (SM) thread scheduling and programming model/interface according to at least one embodiment of the present disclosure.

FIGS. 7A and 7B illustrate how dimensions of embeddings change and an analysis of the dimensionality reduction depending on the execution sequence of GNN computations.

DETAILED DESCRIPTION

Figure 1:
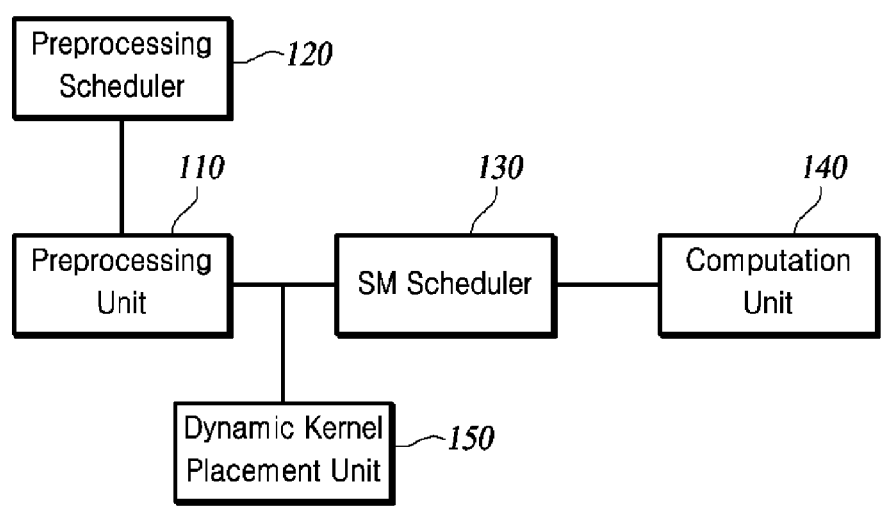
FIG. 1 is a schematic block diagram of a graph-neural network acceleration apparatus according to at least one embodiment of the present disclosure.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of the present disclosure to be presented below in conjunction with the accompanying drawings is intended to describe exemplary embodiments of the present disclosure and is not intended to represent the only embodiments in which the technical idea of the present disclosure may be practiced.

FIG. 1 is a schematic block diagram of a graph-neural network acceleration apparatus 10 according to at least one embodiment of the present disclosure.

The graph-neural network acceleration apparatus 10 performs inference and training in a GPU by running diverse graph neural network models in a destination-centric, feature-wise manner, and re-arrange multiple GNN kernels based on their system hyper-parameters in a self-governing manner. The graph-neural network acceleration apparatus 10 applies pipeline parallelism for efficient graph dataset preprocessing.

As shown in FIG. 1, the graph-neural network acceleration apparatus 10 for accelerating GNNs may include all or some of a preprocessing unit 110, a preprocessing scheduler 120, a streaming multiprocessor (SM) scheduler 130, a computation unit 140, and a dynamic kernel placement unit 150.

The preprocessing unit 110 performs neighbor sampling to prepare subgraphs for each layer of the GNN. The neighbor sampling, seeking to reduce the required amount of vertices for the GNN to compute with as little loss of model accuracy as possible, retrieves the adjacent nodes of one or more destination-vertices in a given batch, and selects n vertices among them according to a certain sampling priority, such as unique random, PageRank, etc. The neighbor sampling assigns new vertex identifiers ("VID") to the selected vertices and stores the pairs of original VIDs and new VIDs as a hash table. The original VIDs of the selected vertices are stored in a sampled node list.

The preprocessing unit 110, after completing the sampling, performs graph reindexing, embedding lookup, and data transfer.

The execution of each of the GNN layers on the GPU considers its inputs as independent datasets which need to be represented in one of the graph storage formats of COO, CSR, and CSC. To this end, a graph reindexing algorithm is arranged for renumbering the subgraphs and preparing the graph structure for the different GNN layers.

GNNs also require the preparation of feature vectors corresponding to the subgraphs. Therefore, the embedding lookup scans the entire embedding table and allocates a new embedding table that stores all feature vectors corresponding to the sampled vertices. This table is the input for layer 1 of the GNN to process. CNN's layer 2 also requires appropriate embeddings, but they will be the results of layer 1's embedding aggregation and combination.

The subgraphs after graph reindexing and the new embedding table after embedding lookup are sent to the target GPU.

On the other hand, although the aforementioned preprocessing tasks are vital for GNN acceleration, they are heavy and time-consuming tasks as all the components require traversing graphs, random scanning of several tables, and copying the corresponding data per service. Therefore, the graph-neural network acceleration apparatus 10 introduces a preprocessing scheduler 120 for reducing the long latency caused by preprocessing.

The preprocessing scheduler 120 divides each of the preprocessing components including neighbor sampling, graph reindexing, embedding lookup, and data transfer into multiple subtasks for each layer of the GNN. The division of subtasks takes into account the type of data exchanged between subtasks and the dependencies between subtasks. The executions of the subtasks are then parallelized using multiple threads per node. In cases where a subtask cannot be parallelized, the preprocessing scheduler 120 makes multiple subtasks that have no dependency on each other simultaneously run together.

While the scheduling described above can reduce preprocessing time, the thread-level parallelism of the scheduling is limited by locks on accessing shared resources. For example, sampling and reindexing are in contention for hash table access, as sampling and reindexing require updating/referencing a shared resource, the hash table, for every sampled vertex. There is also contention between sampling subtasks, e.g., a sampling subtask for layer 1 and a sampling subtask for layer 2.

To resolve the lock contention, the preprocessing scheduler 120 divides the sampling subtasks into two parts. The first part is involved in the algorithm execution, and the second part is involved in the hash table updates. The preprocessing scheduler 120 then serializes the sampling subtasks dealing with the hash table update, while parallelizing the algorithm part overall. In a similar manner, the preprocessing scheduler 120 avoids contention between subtasks accessing shared resources.

To make the runtime overlap between the embedding lookup subtask and the data transfer subtask, the preprocessing scheduler 120 ensures that the embedding lookup subtask transfers to the GPU each sampled embedding as soon as it is ready, in a pipelined manner.

The latency analysis of preprocessing and the specific operation of the preprocessing scheduler are further described in FIGS. 2A, 2B, 2C, and 2D.

On the other hand, edge-centric scheduling in emerging GNN frameworks may be optimal in traditional graph processing, where many edges need to be visited per vertex, as edge-centric scheduling processes all edges in parallel. However, this method does not benefit from the highly parallel computational power of CPUs in the processing of preprocessed graphs for GNNs. One can observe that the average degree (number of edges per vertex) of the preprocessed graph is 2.9 times smaller than that of the original graph, and the degree distribution of preprocessed graph is even. The analysis of the degree distribution of the graph before and after preprocessing is detailed in FIGS. 3A and 3B. Therefore, in contrast to existing frameworks that process embeddings per edge, it is better to parallelize the processing of embeddings per node when processing GNNs.

Further, considering that traditional graph processing usually uses scalar values for features whereas GNN models need to process features with a much higher dimension, it is better to traverse the graph in a destination-vertex-centric manner and schedule SM threads in a feature-wise manner.

The streaming multiprocess scheduler 130 takes into account the characteristics of GNN graphs, i.e., the limited number of neighbors per destination-vertex and the high dimensionality of features, and groups all features associated with each destination-vertex and allocates them to be processed in parallel within the same SM. Specifically, based on the feature dimension and the maximum number of threads in the SM, the streaming multiprocess scheduler 130 determines the number of the SMs to be allocated for embedding processing of one destination-vertex and allocates the determined number of SMs to each of all destination-vertices included in the subgraph received from the preprocessing unit 110.

Feature-wise thread scheduling maximizes the degree of parallelism without a dramatic increase in memory and/or cache usage. Furthermore, such scheduling does not require any form of coordinate list (COO) graph structures and corresponding data processing algorithms, allowing for the implementation of pure vertex-centric GNN processing according to embodiments of the present disclosure. The issue of increased memory/cache usage in prior art GNN frameworks is discussed further in FIGS. 4A and 4B. The memory/cache usage reduction of the GPU by eliminating the memory/cache usage increase according to at least one embodiment of the present disclosure is described in FIGS. 5A and 5B. Further, a thread scheduling and programming model/interface according to at least one embodiment of the present disclosure is illustrated in FIGS. 6A to 6D.

The computation unit 140 performs a user-designated computation in parallel by a plurality of threads in the SM by using the embeddings of the destination-vertices and the embeddings of the neighbor-vertices assigned to the SM. Here, the user-designated computation is at least one of a forward propagation operation for inference and a backward propagation operation for training.

To further shorten GNN runtime, the dynamic kernel placement unit 150 places kernels by using a cost model that approximates kernel runtime per layer. Specifically, the dynamic kernel placement unit 150 calculates the benefits of executing the combination before the embedding aggregation (hereinafter referred to as the "combination-first execution sequence") and the benefits of executing the embedding aggregation before the combination (hereinafter referred to as the "embedding aggregation-first execution sequence"), and relocates the kernels according to combination-first execution sequence when the benefits of the combination-first execution sequence are greater than the benefits of the embedding aggregation-first execution sequence.

Noting that the dimensionality of the input tensor may change depending on the execution sequence of the embedding aggregation and the combination, which affects computation and memory usage, the present inventors analyzed the change in the dimensionality of the embedding depending on the execution sequence between the embedding aggregation and the combination. This is described in FIGS. 7A and 7B.

Figure 8A:
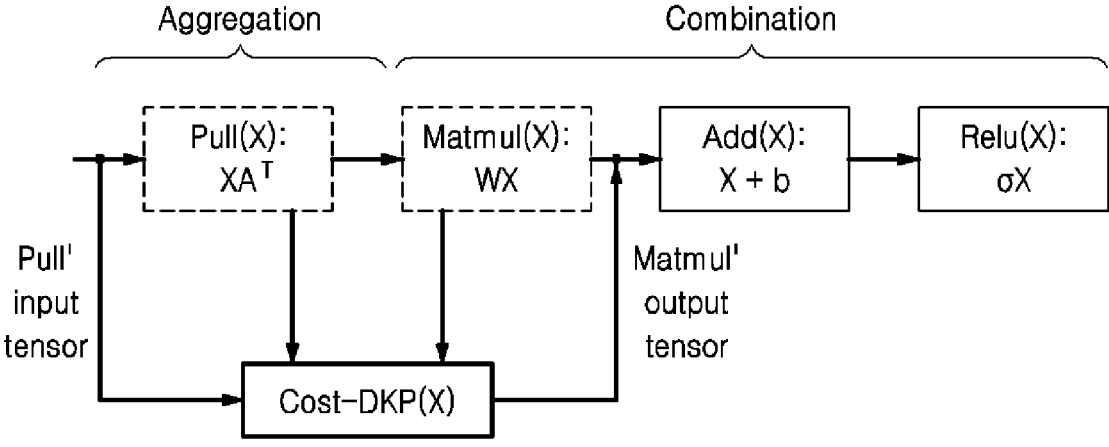
FIG. 8A, FIG. 8B, and FIG. 8C illustrate a dynamic kernel placement and a graph conversion for backward propagation according to at least one embodiment of the present disclosure.

The dynamic kernel placement unit 150 relocates the kernels so that the combination is executed before the embedding aggregation if the combination is superior to the embedding aggregation in reducing the total number of features. As shown in FIG. 8A, the dynamic kernel placement unit 150 checks the DataFlow graph (DFG) at run-time to search for NAPA's Pull and subsequent matrix multiplication of MLP (MatMul). Since the execution sequence of kernels cannot be changed once it is delivered to the GPU, the dynamic kernel placement unit 150 prepares a new DFG node in advance, called Cost-DKP, and replaces the two original nodes with Cost-DKP at the host-side. Then, the dynamic kernel placement unit 150 disconnects the links associated with Pull's input and MatMul's output from the original nodes, and links them to Cost-DKP (and MLP's bias). At runtime, the dynamic kernel placement unit 150 examines the dimensionality of the input tensor and performs the combination first if the dimensionality reduction rate of the combination-first execution sequence is greater than that of the original kernel execution sequence. To achieve this, the inventors model the kernel latency based on different numbers of vertices and embeddings, and introduce such a cost model which is described below.

Figure 7B:
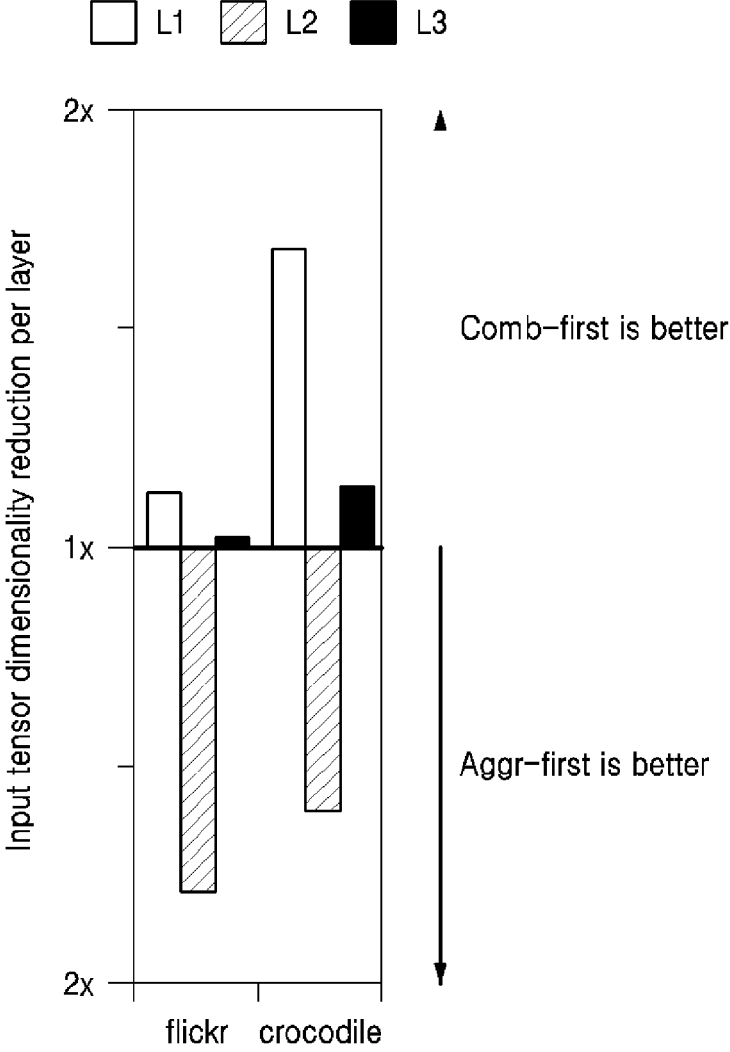

As shown in FIG. 7B, the dimensionality reduction rate varies across different layers even in the same workload execution. While it is clear to see the benefits of changing the execution order of the embedding aggregation and the combination, it is difficult to determine such an execution order before actual execution. Therefore, the present inventors introduce a cost model that approximates the kernel execution time based on the dimensionality of the different input tensors. Table 1 describes the cost model that estimates the benefits of the embedding aggregation-first and combination-first kernel placements in terms of execution time.

TABLE 1

| Aggr-first benefit | FWP | $\dfrac{\text{Reduction factor}}{(n_{Src} - n_{Dst})} \cdot \dfrac{\text{Kernel execution}}{(\alpha \cdot n_{Hid} \cdot n_{Feat} + \beta \cdot n_{Hid})}$ | $\alpha = 6 \cdot 10^{-5}$ $\beta = 1 \cdot 10^{-5}$ |
|---|---|---|---|
| | BWP | $(n_{Src} - n_{Dst}) \cdot$ $(\alpha \cdot n_{Hid} \cdot n_{Feat} + \beta \cdot n_{Feat})$ | $\alpha = 1 \cdot 10^{-7}$ $\beta = 4 \cdot 10^{-6}$ |
| Comb-first benefit | FWP | $\dfrac{\text{Reduction factor}}{(n_{Feat} - n_{Hid})} \cdot \dfrac{\text{Kernel execution}}{(\gamma \cdot n_{Edge} + \delta \cdot n_{Dst})}$ | $\gamma = 1 \cdot 10^{-3}$ $\delta = 1 \cdot 10^{-12}$ |
| | BWP | $(n_{Feat} - n_{Hid}) \cdot (\gamma \cdot n_{Edge} + \delta \cdot n_{Src})$ | $\gamma = 1 \cdot 10^{-6}$ $\delta = 1 \cdot 10^{-8}$ |

The cost model is composed of i) a reduction factor and ii) a kernel execution factor. Since the embedding aggregation reduces the input height of the following combination from nSrc to nDst, the reduction factor may be estimated as (nSrc−nDst). This is because the kernel time is proportional to the reduced input and nHidden. On the other hand, the combination reduces the input width of the following embedding aggregation from nFeature to nHidden, so the reduction factor can be (nFeature−nHidden). At this case, the kernel execution factor takes into account the memory access time of the destination vertex. Thus, the execution time of a combination-first kernel placement is proportional to the dimensionality of the combined embeddings, nEdges, and nDst. The cost model for backward propagation is slightly different from that of forward propagation (e.g., between nSrc and nDst) because of different directions of graph traversal. The present inventors fitted the cost model's coefficient parameters (α, β, γ, and δ) by measuring the execution times with varying numbers of vertices and features. The results are shown on the right side of Table 1. In a preliminary evaluation using these parameters, the present inventors found that the approximated times are very close to the actual execution times. With diverse workloads used in the performance evaluation described below, the cost model exhibited an average error of only 12.5%.

To reduce the overhead due to the graph conversion required by the backward propagation operation of the target model, the dynamic kernel placement unit 150 utilizes host resources to perform in advance a graph format conversion to a compressed sparse matrix (Compressed Sparse Column or CSC) during the execution of the forward propagation operation to allow the CSC to be used in the backward propagation operation. The overhead and specific operations are described further in FIGS. 8B and 8C.

FIGS. 2A to 2D are diagrams for illustrating preprocessing scheduling according to at least one embodiment of the present disclosure.

Figure 2A:
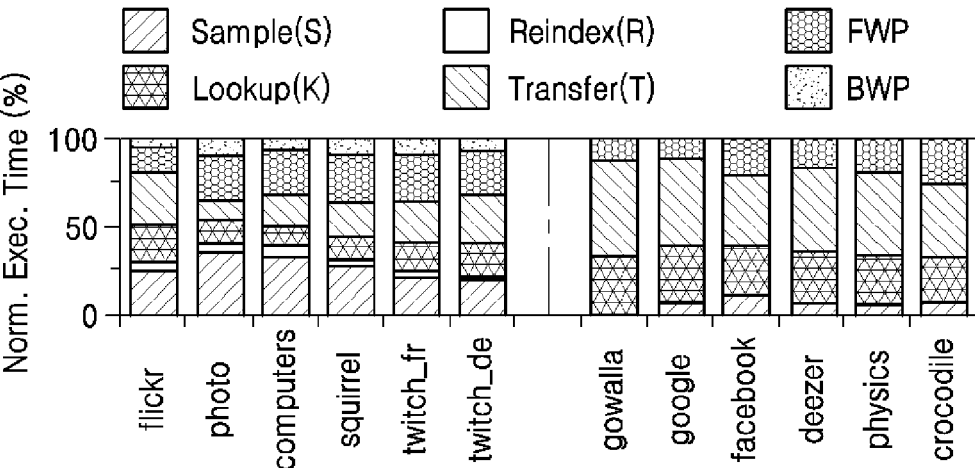
FIGS. 2A, 2B, 2C, and 2D are diagrams for illustrating preprocessing scheduling according to at least one embodiment of the present disclosure.

Referring to FIG. 2A, the end-to-end execution time (Normal Execution Time) is divided into each preprocessing component (sampling, reindexing, embedding lookup, and data transfer) and the GNN computing (FWP+BWP), and the result of comparative analysis is shown. The execution time of the GNN computing accounted for only 24.9% of the end-to-end execution time, on average. Sampling (S) dominates the preprocessing time for workloads with a relatively small size of features (left half of FIG. 2A). In contrast, reindexing (R), embedding lookup (K), and data transfer (T) consumes most of the preprocessing latency for workloads with a relatively large size of features (right half of FIG. 2A).

Figure 2B:
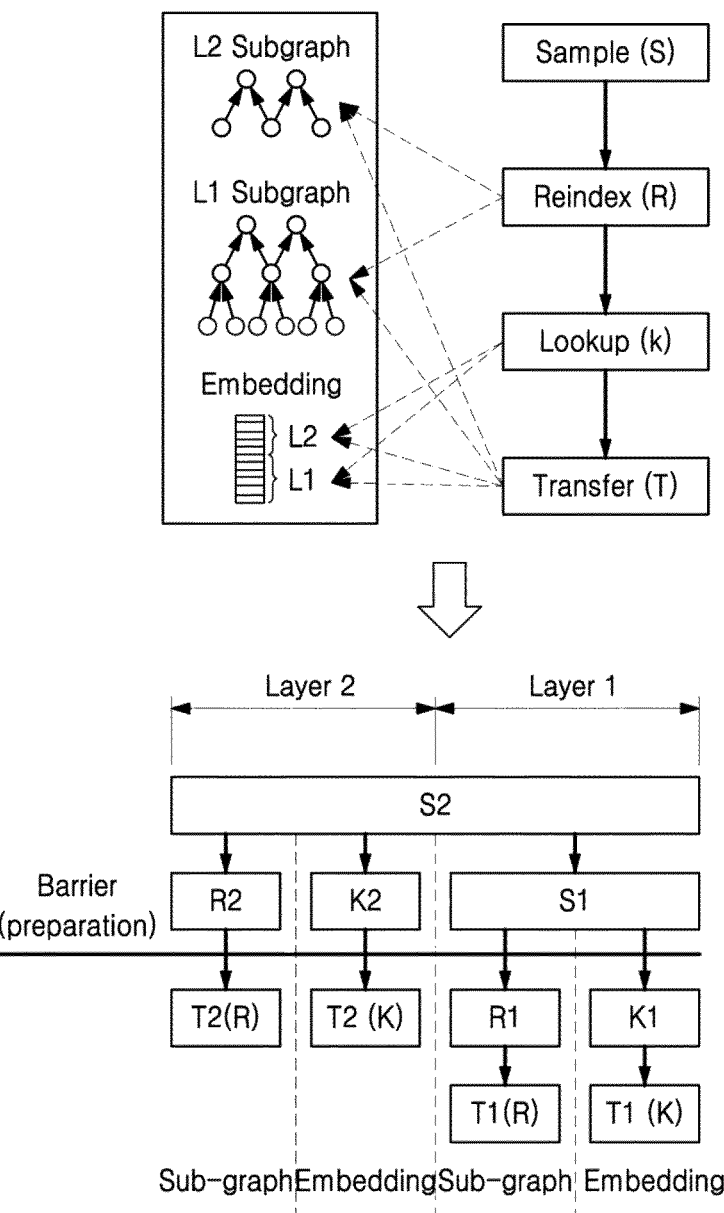

FIG. 2B illustrates the basic idea of preprocessing scheduling. The GNN model is assumed to use two layers. The preprocessing scheduler 120 directly subdivides a single heavy preprocessing operation into per-layer subtasks of sampling (S), reindexing (R), embedding lookup (K), and data transfer (T), and classifies them based on which data type they are associated with (e.g., subgraphs vs. embeddings). Since reindexing (R), embedding lookup (K), and data transfer (T) can only be executed when the sampled graphs are ready, the preprocessing scheduler 120 schedules subtasks S2 and S1 (which are subtasks for layer 2 and layer 1, respectively) to run consecutively. On the other hand, the size of the subgraphs and the embedding tables is determined after sampling. Therefore, the preprocessing scheduler 120 schedules the embedding lookup (K) subtask and data transfer (T) subtask for layer 2 before the completion of subtask S1, so that they can be executed with a maximum degree of parallelism. At the same time, the preprocessing scheduler 120 executes reindexing (R), embedding lookup (K), and data transfer (T) subtasks, which handle the input subgraph and embedding in parallel.

Figure 2C:
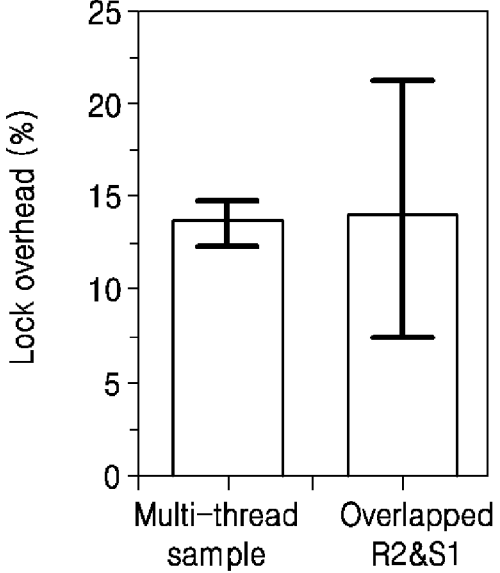

FIG. 2C illustrates the lock overhead due to lock contention between subtasks. The overheads due to contention between threads S1 and S2 within the sampling (S) subtask and contention between sampling (S1) and reindexing (R2) account for 13.5% and 14.2% of the total preprocessing time, respectively.

Figure 2D:
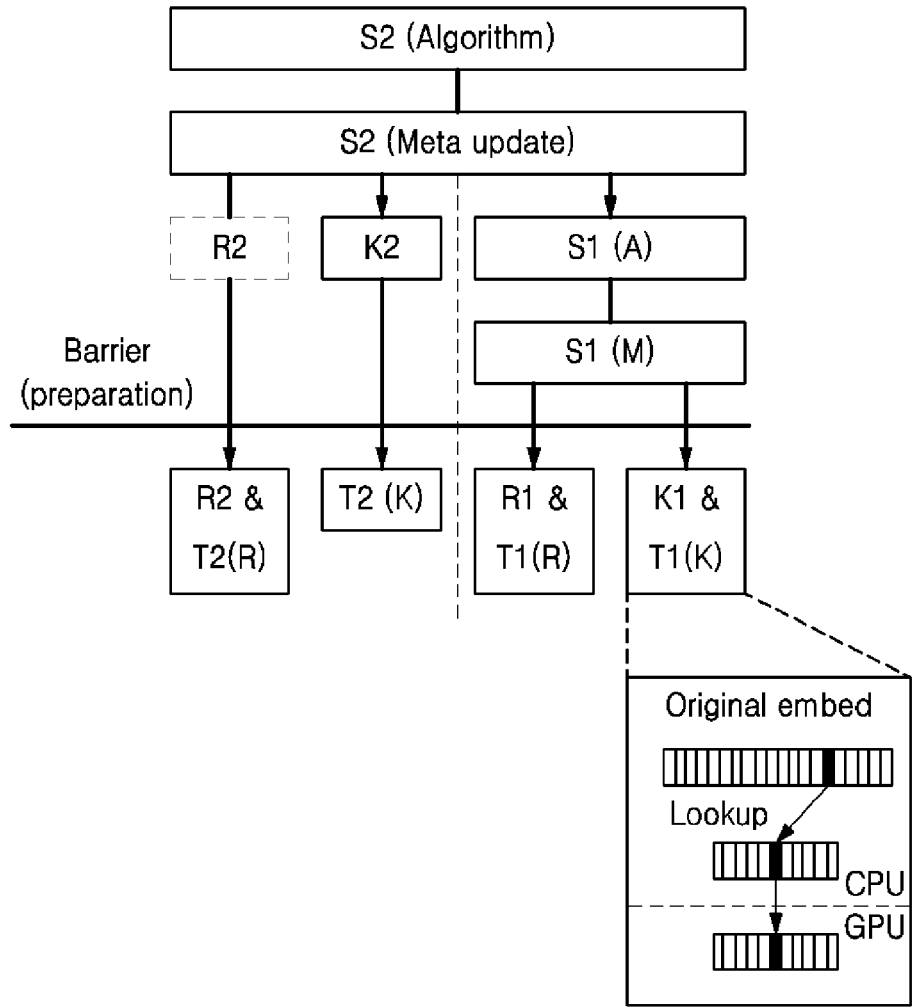

FIG. 2D illustrates the optimization of preprocessing scheduling with relaxed lock contention. The preprocessing scheduler 120 divides the sampling subtasks into a part involved in the algorithm execution and a part involved in updating the hash table and then serializes sampling subtasks dealing with updating the hash table, while fully parallelizing the algorithmic part. Similarly, the preprocessing scheduler 120 avoids contention between subtasks accessing shared resources. To overlap runtime between the embedding lookup subtask and data transfer subtask, the preprocessing scheduler 120 ensures that the embedding lookup subtask immediately transfers the sampled embedding whenever it is ready to the GPU, in a pipelined manner.

Figure 3A:
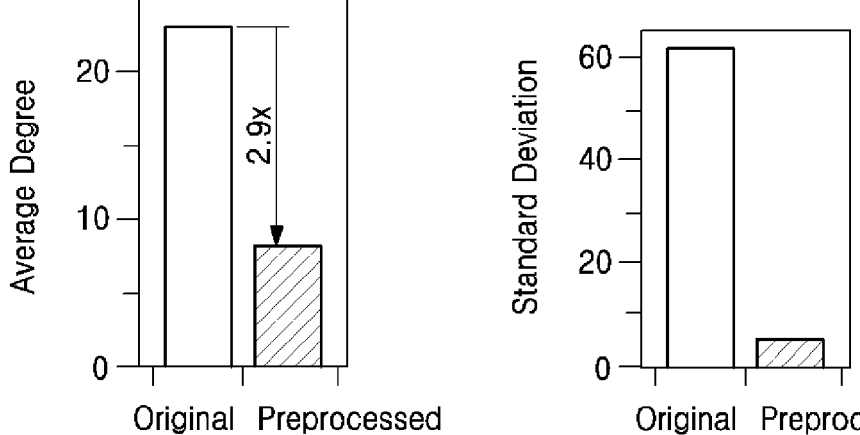
FIGS. 3A and 3B illustrate analyzing a degree distribution of a graph before and after preprocessing.
Figure 3B:
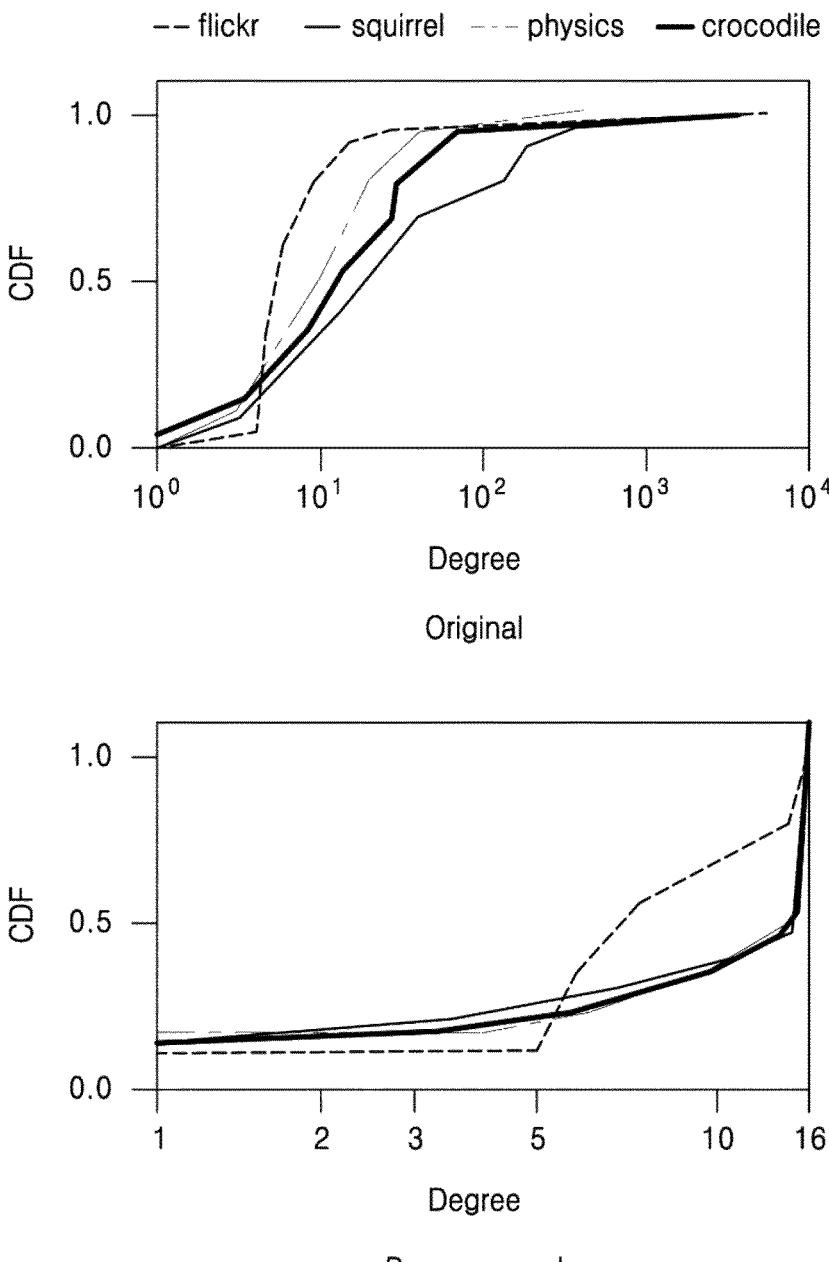

FIGS. 3A and 3B illustrate analyzing a degree distribution of a graph before and after preprocessing.

FIG. 3A illustrates a comparison of the average degree (edges per vertex) of the original and preprocessed graphs as well as the corresponding standard deviations. One can observe that the original graph has many edges per vertex, while the average degree of the preprocessed graph is 2.9 times smaller than that of the original graph. Furthermore, the degree of the preprocessed graph is very even.

FIG. 3B illustrates, to examine the detailed degree distributions, analyzing the cumulative distribution function (CDF) of the degrees of the two types of graphs.

Figure 4A:
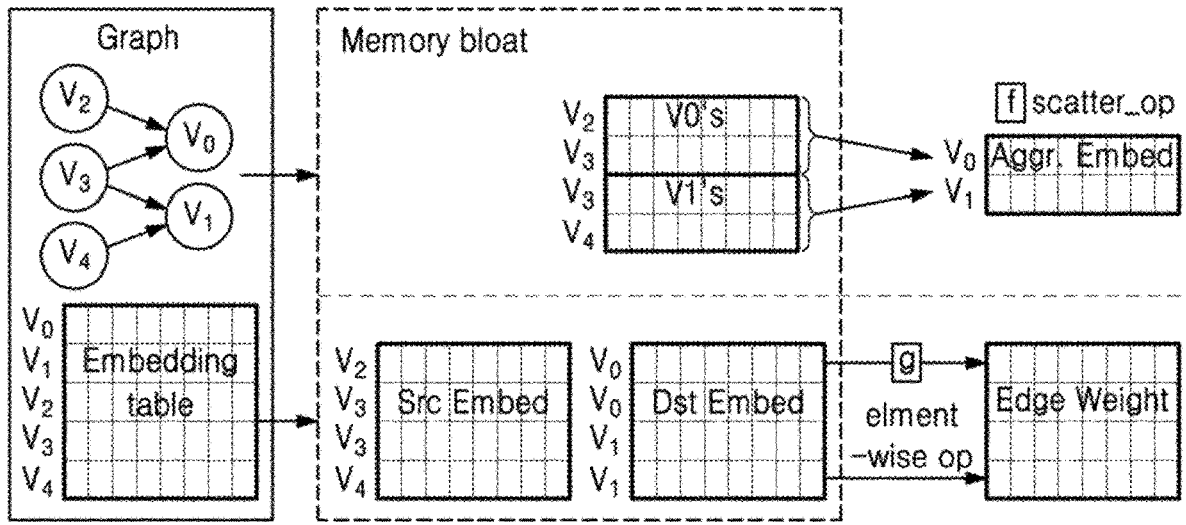
FIGS. 4A and 4B illustrate the increased memory/cache usage issue in prior art GNN frameworks.
Figure 4B:
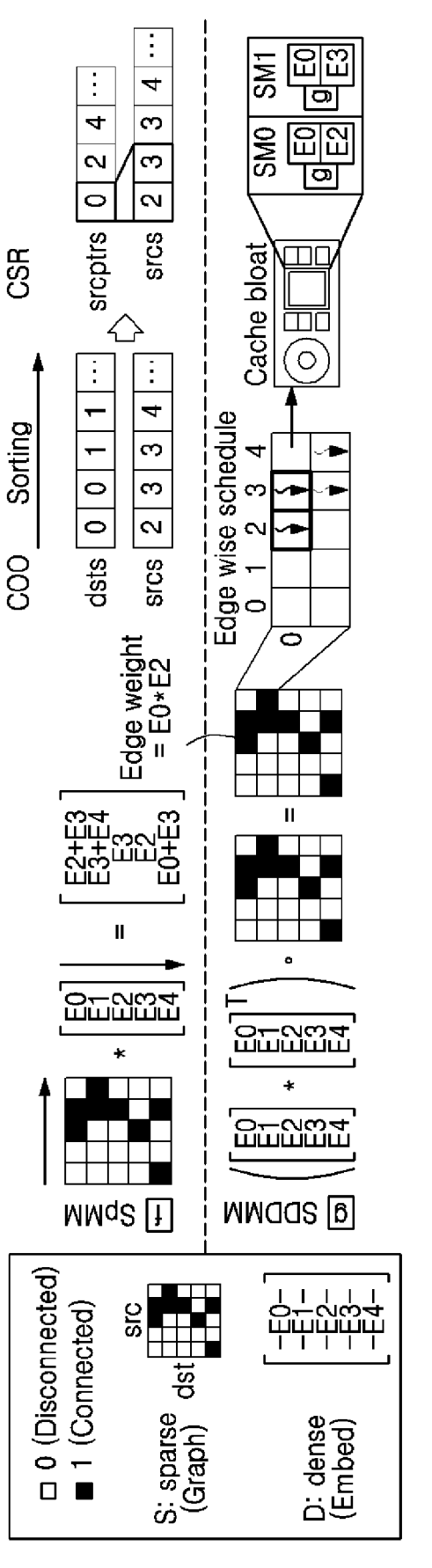

FIGS. 4A and 4B illustrate the increased memory/cache usage issue in prior art GNN frameworks.

The conventional GNN frameworks may be classified into a deep learning approach and a graph-approach based on how they process the graph dataset and analyzed. Here, the deep learning approach is a method of processing dense datasets through GNN kernels obtained by revising the existing deep learning operations, and the graph approach is a method of handling GNNs by directly processing on graph's sparse information.

In the deep learning approach, the massive parallel computational architecture of CPUs is harmonized with the primitives of traditional deep learning, but the sparse-to-dense conversion generates redundant feature vectors on CPUs. Specifically, referring to FIG. 4A, it can be seen that the embeddings corresponding to V3, V0, and V1 are stored redundantly in GPU memory. This increased GPU memory usage exhibits unnecessary data copying and severely wastes the CPU's internal memory.

The graph-approach employs matrix-multiplication based sparse operations working with both graph and embedding information. Specifically, referring to FIG. 4B, the top left and bottom illustrate implementing GNN embedding aggregation and edge weight computation via sparse matrix multiplication (SpMM) and sampled dense-dense matrix multiplication (SDDMM), respectively. The graph approach does not need to prepare additional embeddings within a GPU, eliminating the issue of increased memory usage of the deep learning approach. However, the graph approach uses per-edge scheduling to allocate a thread block per edge and threads in the block process multiple features in the corresponding embedding. This causes multiple copies of the embedding to reside on different SMs, leading to increased cache usage (in FIG. 4B, E0 is redundantly copied to SM0 and SM1). The present inventors observed that the increased cache usage increased the memory requirement by 41.8% in multiple workloads tested.

Figure 5A:
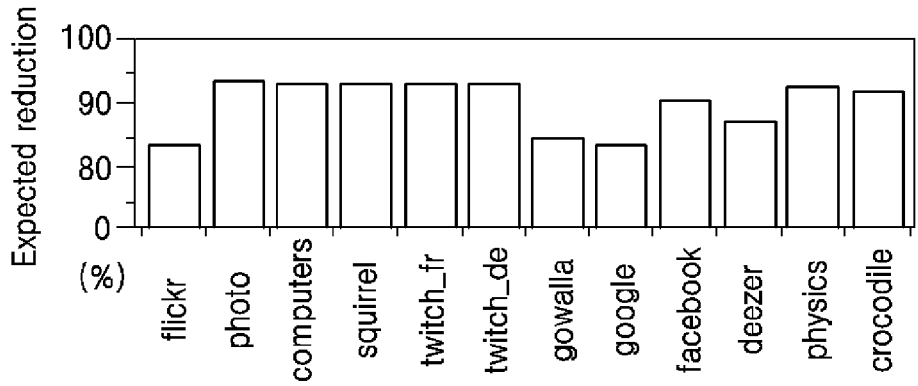
FIGS. 5A and 5B illustrate a reduction in memory/cache usage in a GPU when the increased memory/cache usage issue is eliminated, according to at least one embodiment of the present disclosure.
Figure 5B:
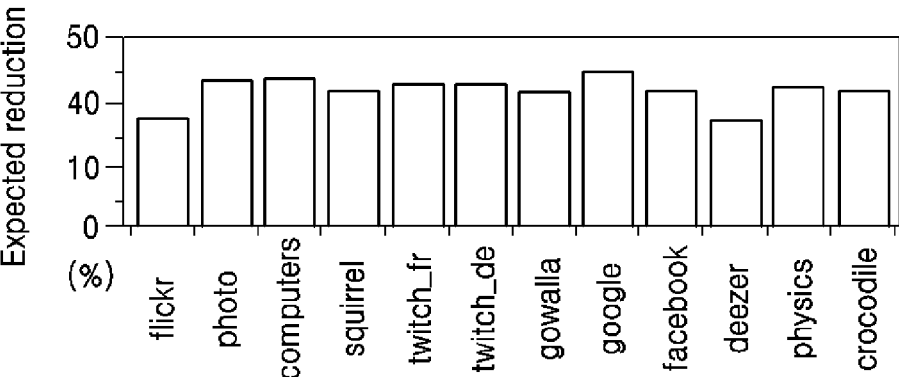

FIGS. 5A and 5B illustrate a reduction in memory/cache usage in a GPU when the increased memory/cache usage issue is eliminated, according to at least one embodiment of the present disclosure.

FIG. 5A illustrates the expected memory usage reduction for diverse workloads after eliminating the issue of increased memory usage. The graph-neural network acceleration apparatus 10 uses a compressed sparse row matrix (CSR) alone as an input graph format and thus computes weights without converting sparse information into a dense tensor. Accordingly, diverse GNN models when implemented with the graph-neural network acceleration apparatus 10 can reduce memory space requirements by an average of 90.1% across all workloads.

FIG. 5B illustrates the expected cache usage reduction for diverse workloads after eliminating the issue of increased cache usage. Since the graph-neural network acceleration apparatus 10 schedules SM threads in a destination-vertex-centric manner, rather than processing each edge in parallel (edge-centric), it can reduce the expected cache usage increase by an average of 44.4% across all workloads.

FIG. 6A, FIG. 6B, FIG. 6C, and FIG. 6D illustrate an SM thread scheduling and programming model/interface according to at least one embodiment of the present disclosure.

Figure 6A:
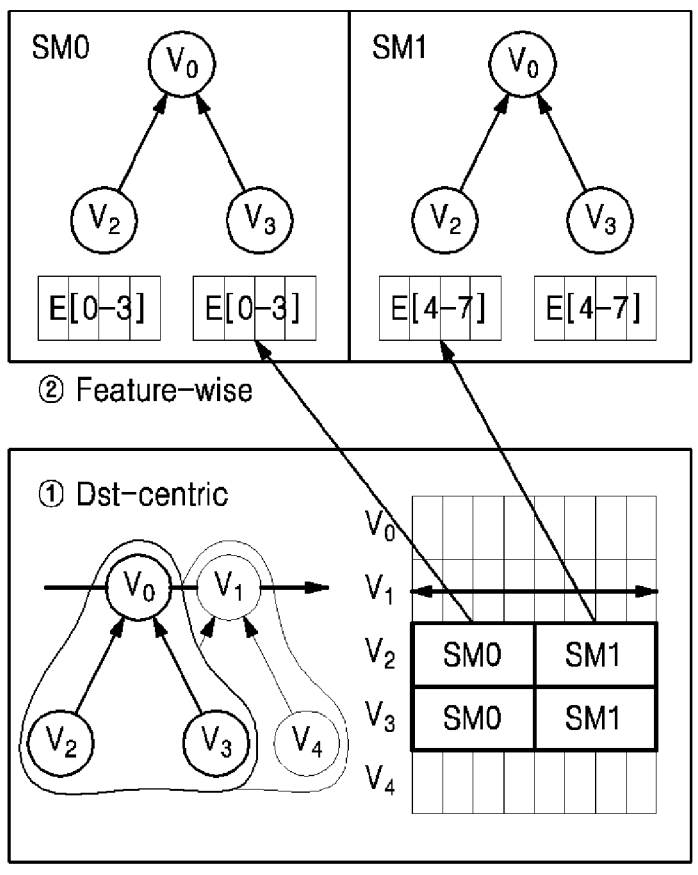

As shown in FIG. 6A, the SM-streaming multiprocess scheduler 130 traverses graphs in a destination-vertex-centric manner and schedules SM threads by features. Specifically, all features associated with each destination-vertex are grouped and assigned to be processed in parallel by the same SM. This feature-wise thread scheduling takes into account the characteristics of GNN graphs, namely the limited number of neighbors per destination-vertex and the high dimensionality of features, to maximize parallelism without dramatically increasing memory and/or cache usage. Such scheduling does not require any form of COO graph and data processing algorithms, allowing for the implementation of pure vertex-centric GNN processing according to embodiments of the present disclosure.

Figure 6B:
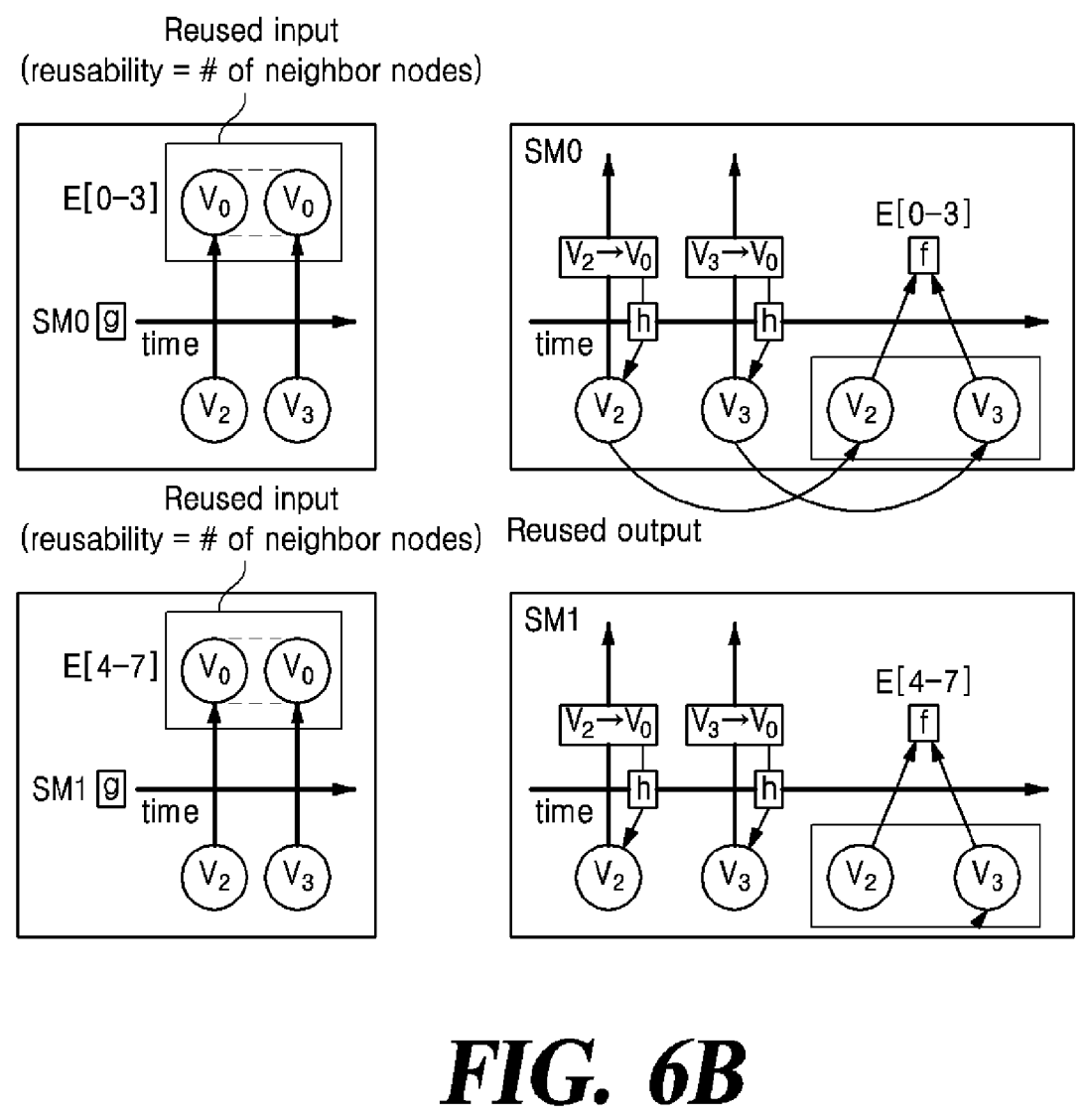

FIG. 6B illustrates an interface of a NeighborApply-Pull-and-Apply ("NAPA") programming model based on destination-centric feature-wise scheduling according to at least one embodiment of the present disclosure. The NAPA programming model according to this embodiment is composed of three primitives of i) NeighborApply, ii) Pull, and iii) Apply. Of these primitives, NeighborApply and Pull fully implement SDDMM (edge weight computation) and SpMM (embedding aggregation), respectively, to process feature vectors and multiple per-layer subgraphs represented by CSR.

Compared to the deep learning-approach, NAPA has no sparse-to-dense data conversion, because NeighborApply according to this embodiment accesses the subgraph of each layer and applies the edge weighting operation (g) directly to the embedding.

Unlike the graph-approach, NeighborApply according to this embodiment allocates all destination-vertex-related embeddings to the same SM, schedules SM threads in a feature-wise manner, and processes the embeddings. For example, since NAPA traverses the target graph based on destination-vertices, NeighborApply logically splits the embeddings of the currently visited node (e.g., V0, V2, and V3) into multiple sub-embeddings and allocates each of them to different SMs (left side of FIG. 6B).

Unlike the graph-approach's edge weight computation which repeatedly copies the embedding of the destination vertex to as many SMs as the neighbor vertices that are present, NAPA loads the embedding of the destination vertex just once and reuses that embedding during the execution of NeighborApply. Meanwhile, Pull loads the weights computed by NeighborApply and the corresponding source vertex's embeddings (right side of FIG. 6B). Thus, when Pull aggregates the embeddings of V2 and V3, SM can reuse the weighted embeddings (output of h). By reusing embeddings in the SM, NAPA reduces global memory accesses and further shortens the execution time. For combinations, the computations of MLPs are mostly matrix transformation, which is already well harmonized with the massive parallel computing power of GPUs. Therefore, Apply according to this embodiment leverages Tensor-Flow's primitives (e.g., tf.matmul, tf.nn.bias_add, and tf.nn.relu) to implement dense data processing of typical MLPs.

Figure 6C:
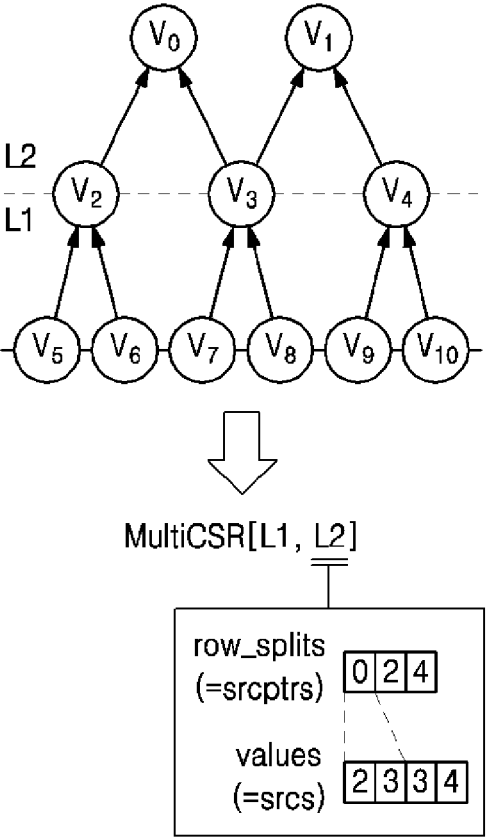

FIG. 6C illustrates sampled subgraphs and an example new data structure ("Multi-layer CSR") that includes sampled subgraphs in accordance with at least one embodiment of the present disclosure.

The multi-layer CSR is composed of an inner tensor, an outer tensor, and a value tensor by using a ragged tensor. As shown in FIG. 6C, the multiCSR corresponding to the outer tensor includes offsets of the inner tensor, each offset managing a subgraph node ID of a different layer. In this example, the outer tensor includes the subgraphs of layer 1 (L1) and layer 2 (L2), each represented by values corresponding to the value tensor and row splits corresponding to the inner tensor. The value tensor and inner tensor are simply the source array and source pointer array of the CSR. So, the index of the inner tensor indicates the destination vertex number, and each element contains an offset in the value tensor, which manages the corresponding neighbor node ID. Furthermore, all tensors in the multi-layer CSR are stored in a contiguous memory space, allowing the host to simply transfer data to the target GPU.

Figures 6D, 7A:
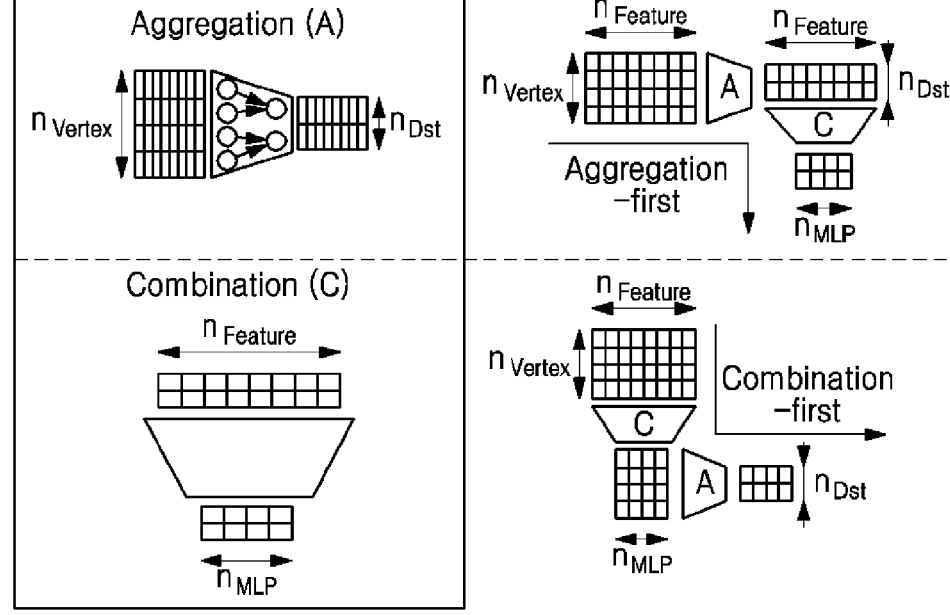

FIG. 6D illustrates an example of high-level implementation of a neural graph collaborative filtering (NGCF) model for a recommender system by using a multi-layer CSR and a NAPA programming model according to at least one embodiment of the present disclosure.

NGCF computes weights in addition to basic embedding aggregation and combination. The user first configures, for NGCF's average-based embedding aggregation, the type of f, g, and h functions such as mean, element-wise product, and sum using a mode variable (lines 3-4). For a given number of layers (nLayers), the NGCF model iteratively computes the weights and aggregates them along with the target embeddings, and transforms the aggregated result to the embedding result (lines 7-9). At the same time, each layer of NGCF can obtain the corresponding subgraph from the given multi-layer CSR (multiCSR) by using its layer index, which allows NeighborApply, Pull, and Apply to process the corresponding subgraph data and embeddings. Additionally, the user can simply implement different GNN models by reconfiguring the modes.

FIGS. 7A and 7B illustrate how dimensions of embeddings change and an analysis of the dimensionality reduction depending on the execution sequence of GNN computations.

FIG. 7A illustrates how the dimensions of embeddings are changed by embedding aggregation and combination. Since the embedding aggregation is the process of accumulating the nSrc number of source embeddings to the nDst number of destination embeddings, the height of the aggregated embeddings table becomes equal to nDst. In contrast, the combination transforms the nFeatures number of features to the nHidden number of features, which is equal to the number of columns in the weight matrix of MLP, thereby reducing nFeatures rather than nSrc. This property causes the size of the input tensor for forward and backward propagation to change depending on which process is applied first.

As shown in FIG. 7B, the present inventors analyze the input tensor dimensionality reduction per GNN layer for two representative real-world workloads used in the performance evaluation to be described below. When running the combination before the embedding aggregation (combination-first), the input tensor dimensionality was reduced by 31.7% on average for layer 1 of flickr and layers 1 and 3 of crocodile. For the other layers, the gains were higher when running in the conventional execution sequence (aggregate embeddings-first).

Figure 8B:
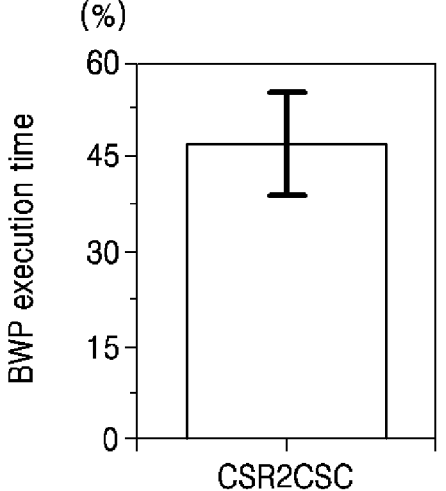
Figure 8C:
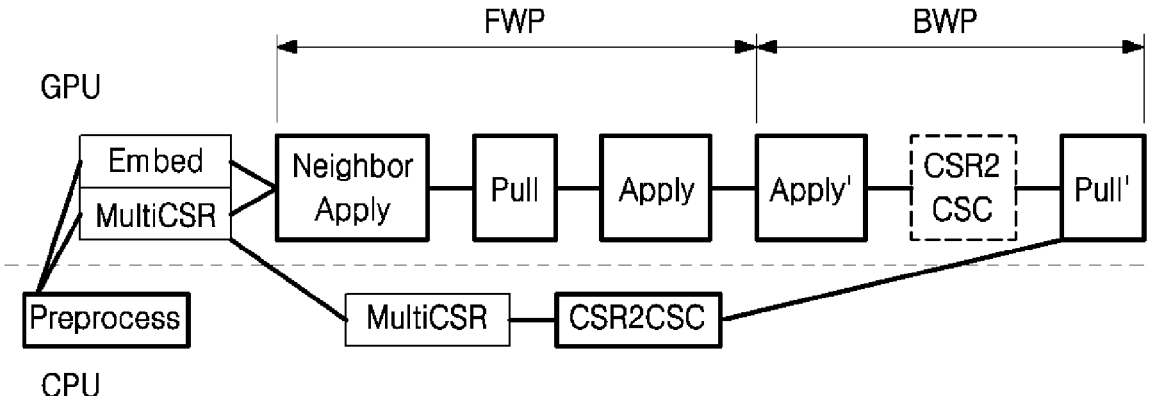

FIG. 8A, FIG. 8B, and FIG. 8C illustrate a dynamic kernel placement and a graph conversion for backward propagation according to at least one embodiment of the present disclosure.

FIG. 8A has been already described.

FIG. 8B illustrates the overhead of transposing a graph. On average, this overhead accounts for 47.0% of the backward propagation (BWP) latency. While backward propagation has a relatively lower computation overhead than forward propagation because it only computes the losses propagated to the MLP's weights, graph conversion requires traversing the input graph, allocating memory space for the CSC, and copying data. This overhead is observed in both the deep learning-approach (CSR to CSC conversion) and the graph-approach (COO to CSC conversion) for their backward propagation.

FIG. 8C illustrates that the overhead from these graph conversions can be made invisible to the user while still preparing the CSC required by GNN learning. To accomplish this, a CSR to CSC conversion (CSR2CSC) is performed in advance by utilizing host resources. Specifically, the dynamic kernel placement unit 150 locates two nodes in the GPU-side DFG. The two nodes are a graph conversion kernel (CSR2CSC) and a partial derivative of Pull. Once these kernels are found, the dynamic kernel placement unit 150 deletes CSR2CSC from the GPU-side DFG and adds it to a new DFG for the host-side operations. When making the new DFG, the dynamic kernel placement unit 150 connects the input (multiCSR) and output (CSC) of the CSR2CSC with the appropriate nodes in the GPU-side DFG. Since the CSR2CSC will be performed right after executing the GNN model on the target GPU, the CSCs will be prepared before the forward propagation execution on the GPU is completed.

Figure 9:
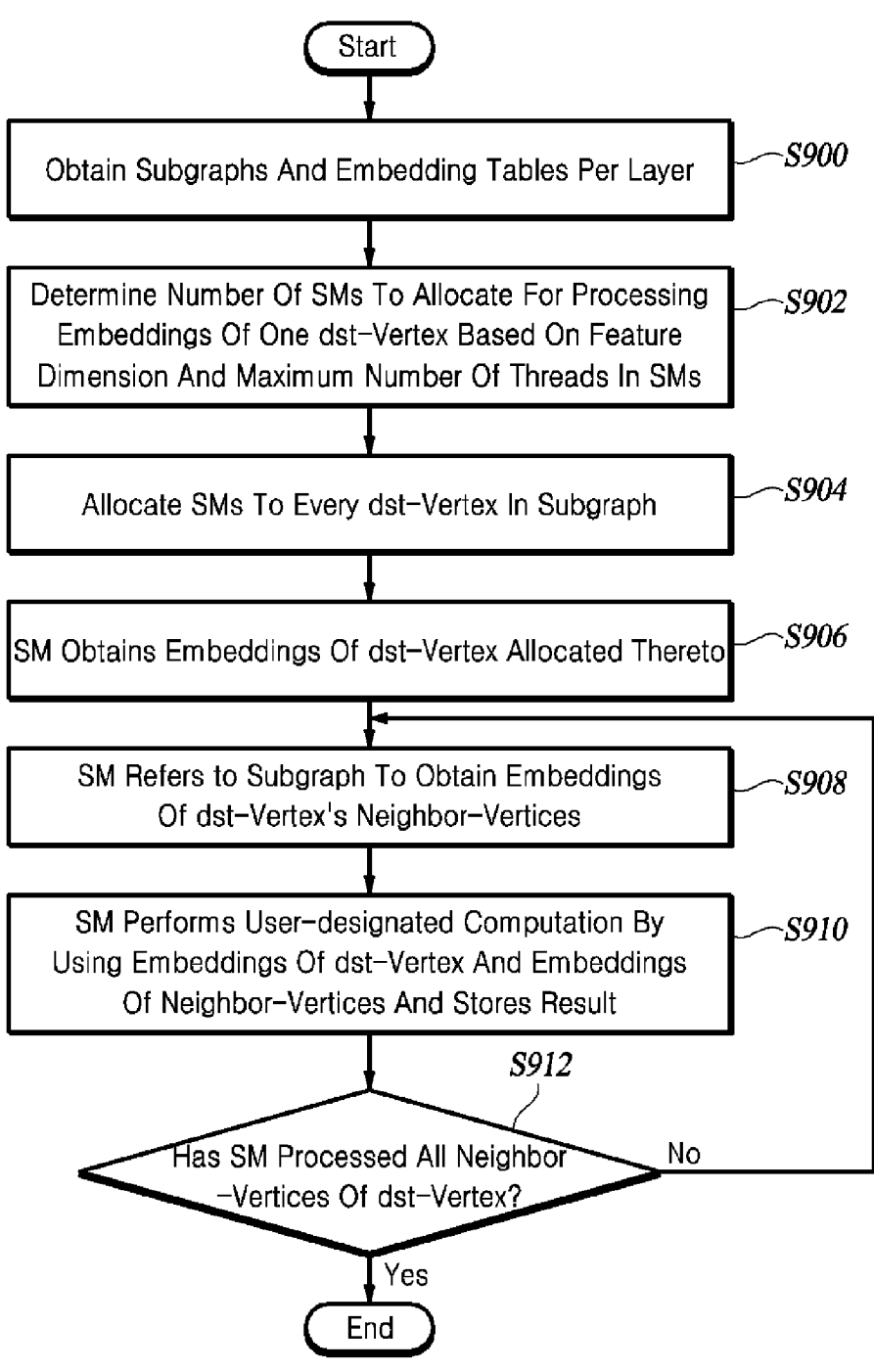
FIG. 9 is a flowchart of a method for accelerating a graph neural network regarding a destination-vertex-centric GNN computation, according to at least one embodiment of the present disclosure.

FIG. 9 is a flowchart of a method for accelerating a graph neural network regarding a destination-vertex-centric GNN computation, according to at least one embodiment of the present disclosure.

As shown in FIG. 9, the streaming multiprocess scheduler 130 obtains a subgraph and an embedding table of the current layer (S900). Based on the feature dimension of the obtained embedding table and the maximum number of threads in the SM, the streaming multiprocess scheduler 130 determines the number of SMs to be allocated for processing embeddings of one destination-vertex (S902). The streaming multiprocess scheduler 130 allocates the determined number of SMs to each of all destination-vertices included in the obtained subgraph (S904).

The SM obtains the embeddings of the destination-vertex allocated to the same SM (S906), and obtains the embeddings of the destination-vertex's neighbor-vertices (S908) using the subgraph. The SM performs a user-designated computation by using the embeddings of the destination-vertex and the embeddings of neighbor-vertices and stores the result (S910). Steps S908 and S910 are repeated until the SM has processed the embeddings of all neighbor-vertices of the destination-vertex (S912).

Figure 10:
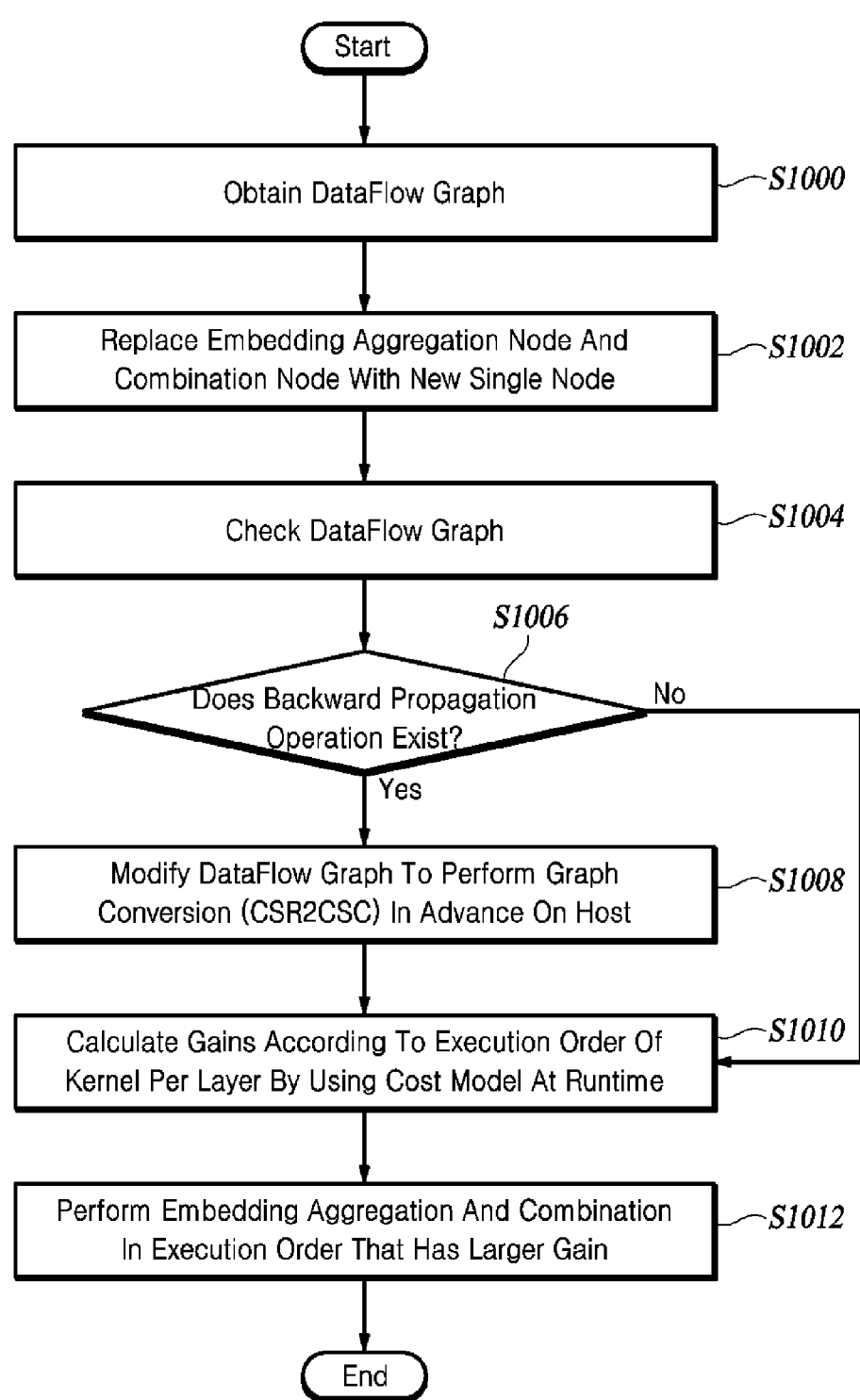
FIG. 10 is a flowchart of a method for accelerating a graph neural network regarding a dynamic kernel placement, according to at least one embodiment of the present disclosure.

FIG. 10 is a flowchart of a method for accelerating a graph neural network regarding a dynamic kernel placement, according to at least one embodiment of the present disclosure.

As shown in FIG. 10, a DataFlow graph (S1000) is obtained. To reduce the execution time by considering the reduction of the dimensionality according to the execution sequence of the GNN computation, the method replaces the embedding aggregation node and the subsequent combination node of the obtained DataFlow graph with a new single node (S1002).

To reduce the overhead caused by the graph conversion (CSR2CSC) for backward propagation, the method checks the DataFlow graph (S1004) to determine if a backward propagation operation exists (S1006). If a backward propagation operation exists in the DataFlow graph, the method modifies the DataFlow graph to perform the graph conversion in advance on the host (S1008).

At the new single node, the method calculates gains according to execution orders of the kernels per layer by using the cost model at runtime (S1010) and performs embedding aggregation and combination in the execution order having a larger gain (S1012).

Figure 11:
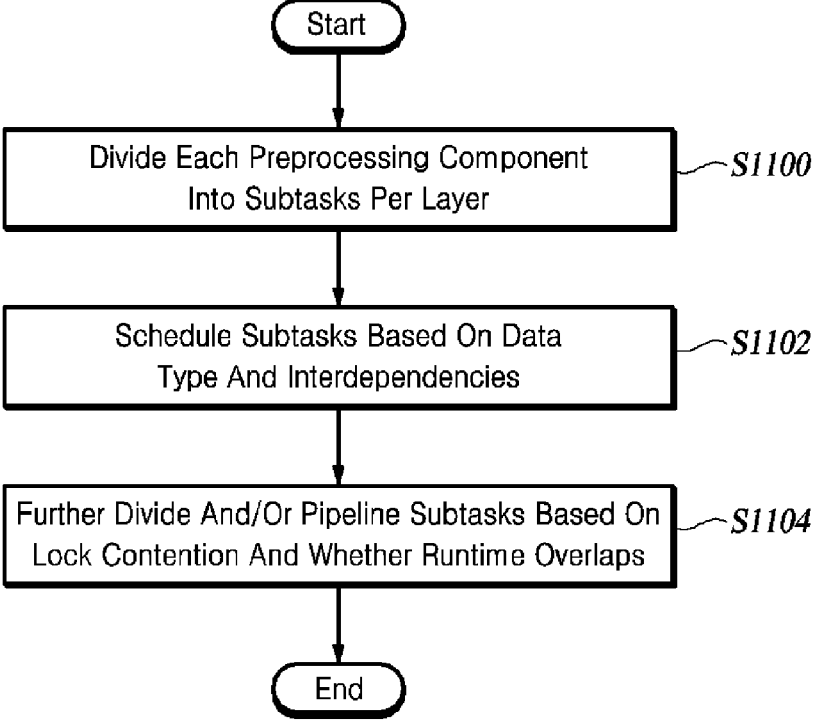
FIG. 11 is a flowchart of a method for accelerating a graph neural network regarding a preprocessing parallelization, according to at least one embodiment of the present disclosure.

FIG. 11 is a flowchart of a method for accelerating a graph neural network regarding a preprocessing parallelization, according to at least one embodiment of the present disclosure.

As shown in FIG. 11, the method divides, on the host, each of the preprocessing components including graph sampling, graph reindexing, embedding lookup, and data transfer to the GPU into at least one or more subtasks for each layer of the graph neural network (S1100). The method then schedules the subtasks for sequential or parallel processing based on the type and interdependencies of the input and output data (S1102). The method further partitions and/or pipelines the subtasks based on lock contention upon accessing shared resources and whether or not execution times are overlapped (S1104).

The following describes the results of analyzing/evaluating the performance of the graph-neural network acceleration apparatus 10 according to at least one embodiment of the present disclosure.

Evaluation Methods

For the comparative evaluation of the deep learning approach and the graph approach, the present inventors used the state-of-the-art frameworks Pytorch Geometry ("PyG") 1.7.0 and Deep Graph Library ("DGL") 0.6.1.

The present inventors have implemented/evaluated the graph-neural network acceleration apparatus according to embodiments of the present disclosure with three versions of GraphTensor, which are i) Base-GT, ii) Dynamic-GT, and iii) Prepro-GT. Base-GT is the most basic version provided with only destination-centric feature-wise SM thread scheduling, Dynamic-GT was provided with dynamic kernel placement added, and Prepro-GT was provided with dynamic kernel placement and preprocessing scheduling added. All GraphTensor versions were implemented using Tensorflow 2.4.0.

In the evaluation, the present inventors used a high-performance GPU RTX 3090, which has 82 (eighty-two) 1.4 GHz SM processors, 10K CUDA cores, and 24 GB GDDR6×DRAM. The testbed used had a processor (Intel i5-9600K) with six cores running at 3.7 GHz and 64 GB DDR4-2666 main memory. The testbed used Ubuntu 18.04, Python 3.8, CUDA 11.1, and cuDNN 8.

GNN Models

The present inventors evaluated two GNN models, Graph Convolutional Network (GCN) and Neural Graph Collaborative Filtering (NGCF).

GCN is one of the most successful GNN models and has been broadly adopted in many different computing systems, such as vertex/graph classification. GCN accumulates the embeddings of neighbor vertices through an average-based aggregation (Mean) and does not weight edges of the target graph. NGCF is known as a model for recommender systems.

NGCF takes into account the similarity between embeddings by applying similarity as weights for edges to the average-based aggregation of embeddings. Similarity weights are calculated through element-wise product and sum-based weight accumulation, and used for embedding aggregation, emphasizing the embedding of vertices with high similarity.

Workloads and Datasets

The present inventors evaluated GraphTensor on 12 real-world graphs published in several dataset repositories, and these workloads are commonly used in the machine learning community. Some graphs do not offer vertex feature vectors (e.g., brightkite, gowalla, google), and for these workloads, the present disclosure created and used embeddings of the same size as those of CNN's real-world industrial application scenarios. The important characteristics of the real graphs and corresponding sampled graphs are summarized in Table 2.

The present inventors sorted the workloads based on the dimensionality of the embeddings (low→high). In Table 2, workloads with feature dimensionality less than 4K are categorized as low-dimensional feature graphs (light feature graphs), and workloads with feature dimensionality greater than 4K are categorized as high-dimensional feature graphs (heavy feature graphs).

TABLE 2

| | | Full graph | | | Sampled graph | | | | | Task | Latency |
| | Name | Vertices | Edges | Feat. dim. | Vertices | Edges | Dst. vertices | Edges/ vertices | Feat. size | Out. dim. | Base-GT |
|---|---|---|---|---|---|---|---|---|---|---|---|
| Light feat. | flickr[1] | 89.2K | 449.9K | 500 | 62.0K | 175.6K | 18.7K | 3.1 | 123 MB | 7 | 0.47 ms |
| | photo[2] | 7.5K | 119.0K | 745 | 7.2K | 126.0K | 8.9K | 17.7 | 21 MB | 8 | 0.28 ms |
| | computers[2] | 13.3K | 245.7K | 767 | 12.7K | 185.6K | 12.7K | 14.8 | 38 MB | 10 | 0.44 ms |
| | squirrel[3] | 5.2K | 217.0K | 2089 | 4.9K | 82.2K | 6.2K | 17.1 | 41 MB | 5 | 0.47 ms |
| | twitch_fr[3] | 6.5K | 112.7K | 2275 | 6.0K | 97.3K | 6.9K | 16.5 | 54 MB | 2 | 0.64 ms |
| | twitch_de[3] | 9.5K | 153.1K | 2514 | 8.5K | 118.9K | 8.6K | 14.3 | 85 MB | 2 | 1.04 ms |
| Heavy feat. | gowalla[4] | 196.6K | 1.9M | 4353 | 49.3K | 159.4K | 13.2K | 3.2 | 857 MB | 2 | 3.12 ms |
| | google[5] | 916.4K | 5.1M | 4353 | 46.7K | 152.3K | 13.5K | 3.3 | 813 MB | 2 | 2.50 ms |
| | facebook[3] | 22.4K | 171.0K | 4713 | 17.1K | 138.6K | 11.6K | 8.4 | 323 MB | 4 | 2.14 ms |

TABLE 2-continued

| Name | Full graph | | | Sampled graph | | | | | Task | Latency |
|---|---|---|---|---|---|---|---|---|---|---|
| | Vertices | Edges | Feat. dim. | Vertices | Edges | Dst. vertices | Edges/ vertices | Feat. size | Out. dim. | Base-GT |
| deezer[6] | 28.2K | 92.8K | 7810 | 19.6K | 95.4K | 10.4K | 5.2 | 613 MB | 2 | 3.44 ms |
| physics[2] | 34.4K | 248.0K | 8415 | 29.4K | 217.8K | 17.0K | 7.6 | 990 MB | 5 | 6.87 ms |
| crocodile[3] | 11.6K | 180.0K | 13.2K | 8.6K | 99.8K | 7.8K | 11.9 | 453 MB | 2 | 4.05 ms |

[1]GraphSAINT [17]
[2]GNN benchmark (42)
[3]MUSAE [43]
[4]PSMM (44)
[5]NCP [45]
[6]FEATHER [46]
* feat. = feature, dim. = dimension, out. = output Performance Analysis GNN Inference Execution Time Analysis The present inventors evaluated the inference execution times of DGL, PyG, and Dynamic-GT by normalizing them to the execution time of Base-GT. The actual inference execution time of Base-GT is summarized in Table 2. For a fair evaluation, the pure execution time of the GPU kernel was measured using Nsight Systems from NVIDIA.

With low-dimensional feature graphs, GCN and NGCF showed different performance behaviors on their inferences.

The performance of DGL (graph-approach) was generally worse than all other frameworks for both GCN and NGCF. Specifically, DLL's performance was 1.24 times and 2.01 times lower than that of PyG (deep learning-approach) and Base-GT, respectively. The reason for this poor performance compared to other frameworks is the graph conversion (COO→CSR) for embedding aggregation. The graph conversion accounted for 41.7% and 9.2% of the total execution time of DLL's GCN and NGCF, respectively.

PyG (deep learning-approach) exhibits relatively consistent performance across all workloads. PyG shows a slightly lower performance than Base-GT (6.2% lower on average) because it does not require graph conversions, but performed similarly to or even worse than DGL on NGCF. The primary reason for the performance degradation on NGCF is the increased memory usage caused by Sparse2Dense.

Compared to DGL and PyG, Base-GT basically shows 50.3% and 38.5% shorter GCN/NGCF inference execution times across all the workloads. This performance enhancement was thanks to the destination-centric, feature-specific scheduling of SM threads, which removes graph conversions and increased memory/cache usage. Base-GT reduced the execution times of edge-weighted computation by 63.6% and 72.6% compared to DGL and PyG, respectively, by reducing the increase in cache usage. Dynamic-GT's GCN and NGCF inference execution times were 58.4% and 19.1% shorter than Base-GT, respectively. This is because Dynamic-GT made a runtime decision to execute the combination before the embedding aggregation, reducing the size of the target embedding by 1.7 times, on average.

With heavy feature graphs, similar to the processing of light feature graphs, Base-GT performed 1.3 times and 1.4 times faster than DGL and PyG, but the performance gap decreased between DGL and Base-GT. This is because the amount of computation for embedding aggregation and combination severely increases due to high-dimensional features of graphs and many edges, making the overhead of graph conversion relatively negligible. In addition, when processing graphs via NGCF, PyG's performance is always worse than DLL's because, in NGCF, PyG spends most of its time processing Sparse2Dense by using primitives from existing deep learning frameworks (taking 42.5% of the total NGCF runtime). On the other hand, Dynamic-GT reduced the GCN and NGCF inference times of Base-GT by 51.1% and 19.5%, respectively. The primary reason for this performance enhancement is that the present disclosure modifies the execution sequence of the kernels if performing combination first could further reduce the amount of embeddings to compute. This performance gain of dynamic kernel placement is even more promising when Dynamic-GT processes GCN rather than NGCF. This is because the edge weighting computation, which occupies 43.7% of the total execution time, is hard to get benefit from kernel scheduling.

GNN Training Execution Time Analysis

This was carried out on two workloads, photo, and crocodile, representing light feature graphs and heavy feature graphs, respectively, and analysis was performed on the training execution times of GCN and NGCF by decomposing them by forward propagation time, backward propagation time, and graph conversion time for both processes.

For the same reason that Base-GT outperforms DGL and PyG in inference, Base-GT reduced the execution time of learning by 36.7% and 31.1% compared to DGL and PyG, respectively.

Dynamic-GT further reduced Base-GT's GCN and NGCF execution times by 43.2% and 17.7%, respectively. This is because dynamic kernel placement reduces the amount of data computed by forward propagation while preprocessing scheduling allows graph conversions for backward propagation to be performed on the host side first.

Forward propagation took more processing times than backward propagation, since the latter does not calculate the partial derivatives of aggregation of embeddings and the edge weighting at the last layer (i.e., the first layer of forward propagation). Furthermore, this impact was more evident when processing heavy feature graphs by using NGCF. On the other hand, for light feature graphs, backward propagation took an average of 44.0% of the total training time, and the corresponding graph conversion took 42.8% of the backward propagation execution time. By performing these operations on the host side first, Dynamic-GT further reduced the training execution time by an average of 27.0%.

End-to-End Runtime Analysis

The performance behaviors of DGL, PyG, and Base-GT were similar to each other. This is because these frameworks execute sampling, reindexing, embedding lookup, and data transfer in a serialized order.

In contrast, Prepro-GT was able to reduce end-to-end execution times by an average of 29.0% and 47.4% with light feature graphs and heavy feature graphs, respectively.

This performance enhancement is mainly thanks to relaxing the dependency chains between smaller subtasks by preprocessing scheduling, resulting in the parallelization of execution.

Although the completion time of sampling and reindexing in Prepro-GT was longer than that of Dynamic-GT, the embedding lookup and data transfer in Prepro-GT were observed as completing on average 31.1% and 35.3% earlier than the completion time by Dynamic-GT, respectively, and as a result, Prepro-GT were able to reduce the execution time of preprocessing by an average of 35.3%. The reason for the slower sampling and reindexing in preprocessing scheduling is that Dynamic-GT runs these processes by fully utilizing the host CPU, while Prepro-GT performs them in parallel, sharing cores with the embedding lookup.

The apparatus or method according to the present disclosure may have the respective components arranged to be implemented as hardware or software, or hardware and software combined. Additionally, each component may be functionally implemented by software, and a microprocessor may execute the function by software for each component when implemented.

Various illustrative implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. The computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as a ROM, CD-ROM, magnetic tape, floppy disk, memory card, hard disk, optical/magnetic disk, storage devices, and the like. The computer-readable recording mediums may further include transitory media such as a data transmission medium. Further, the computer-readable recording medium can be distributed in computer systems connected via a network, wherein the computer-readable codes can be stored and executed in a distributed mode.

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective flowcharts or by performing two or more of the steps in parallel, and hence the steps in the respective flowcharts are not limited to the illustrated chronological sequences.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method for accelerating a graph neural network, the method comprising:
obtaining a subgraph and an embedding table for each layer of the graph neural network;
determining a number of streaming multiprocessors (SMs) to be allocated for processing embeddings of a destination-vertex based on a feature dimension of the embedding table for each layer and a maximum number of threads in each of the SMs;
allocating the determined number of SMs to each of all destination-vertices included in the subgraph;
obtaining, by each of the SMs, the embeddings of the destination-vertex allocated to each SM;
obtaining, by each SM, embeddings of at least one or more neighbor-vertices of the destination-vertex using the subgraph; and
performing, by each SM, a user-designated operation using the embeddings of the destination-vertex and the embeddings of the at least one or more neighbor-vertices.

2. The method of claim 1, wherein the subgraph is represented as a compressed sparse row (CSR) matrix.

3. The method of claim 1, wherein the user-designated operation comprises:
at least one of a forward propagation operation for inference and a backward propagation operation for training.

4. The method of claim 1, further comprising, before the obtaining of the subgraph and the embedding table:
obtaining a DataFlow graph; and
replacing an embedding aggregation node and a subsequent combination node in the DataFlow graph with a new single node,
wherein the new single node is configured to calculate, by using a cost model at run-time, gains according to execution sequences per layer, and to perform an embedding aggregation and a combination in an execution sequence of the execution sequences per layer with a greater calculated gain.

5. The method of claim 4, wherein the cost model approximates a gain based on a dimensionality reduction factor of an input tensor and a kernel execution factor.

6. The method of claim 4, further comprising:
modifying the DataFlow graph so that a format conversion of the subgraph is performed in advance at a host in a situation in which a backward propagation operation is present in the DataFlow graph.

7. The method of claim 1, further comprising, before the obtaining of the subgraph and the embedding table:
dividing each of preprocessing components comprising graph sampling, graph reindexing, embedding lookup, and data transfer to a graphic processing unit (GPU) into at least one or more subtasks per layer of the graph neural network on a host;
scheduling the at least one or more subtasks based on types and interdependencies of input and output data; and
executing the at least one or more subtasks in parallel by using a plurality of threads according to the scheduling.

8. An apparatus for accelerating a graph neural network, the apparatus comprising:

at least one processor; and memory configured to store instructions which, when executed by the at least one processor, causes the apparatus to:

implement a streaming multiprocess scheduler configured to:

obtain a subgraph and an embedding table for each layer, determine a number of streaming multiprocessors (SMs) to be allocated for processing embeddings of one destination-vertex based on a feature dimension of the embedding table for each layer and a maximum number of threads in each of the SMs, and allocate the determined number of SMs to each of all destination-vertices included in the subgraph; and control a computation circuit configured to:

obtain, by each of the SMs, the embeddings of a destination-vertex allocated to each SM, obtain, by each SM, embeddings of at least one or more neighbor-vertices of the destination-vertex using the subgraph, and perform, by each SM, a user-designated operation using the embeddings of the destination-vertex and the embeddings of the at least one or more neighbor-vertices.

9. The apparatus of claim 8, wherein the subgraph is represented as a compressed sparse row (CSR) matrix.

10. The apparatus of claim 8, wherein the user-designated operation comprises:

at least one of a forward propagation operation for inference and a backward propagation operation for training.

11. The apparatus of claim 8, further comprising:

a dynamic kernel placement unit configured to obtain a DataFlow graph and to replace an embedding aggregation node and a subsequent combination node in the DataFlow graph with a new single node, wherein the new single node is configured to calculate, by using a cost model at run-time, gains according to execution sequences per layer, and to perform an embedding aggregation and a combination in an execution sequence of the execution sequences per layer with a greater calculated gain.

12. The apparatus of claim 11, wherein the cost model approximates a gain based on a dimensionality reduction factor of an input tensor and a kernel execution factor.

13. The apparatus of claim 11, wherein the dynamic kernel placement unit to configured to modify the DataFlow graph so that a format conversion of the subgraph is performed in advance at a host in a situation in which a backward propagation operation is present in the DataFlow graph.

14. The apparatus of claim 8, further comprising:

a preprocessing scheduler configured to divide each of preprocessing components comprising graph sampling, graph reindexing, embedding lookup, and data transfer to a graphic processing unit (GPU) into at least one or more subtasks per layer of the graph neural network on a host, and to perform scheduling of the at least one or more subtasks based on types and interdependencies of input and output data; and a preprocessing circuit configured to execute the at least one or more subtasks in parallel by using a plurality of threads according to the scheduling.

15. A non-transitory computer-readable recording medium storing computer-executable instructions for causing, when executed in a computer, the computer to perform process steps comprising:

obtaining a subgraph and an embedding table for each layer of an graph neural network;

determining a number of streaming multiprocessors (SMs) to be allocated for processing embeddings of a destination-vertex based on a feature dimension of the embedding table for each layer and a maximum number of threads in each of the SMs;

allocating the determined number of SMs to each of all destination-vertices included in the subgraph;

obtaining, by each of the SMs, the embeddings of the destination-vertex allocated to each SM;

obtaining, by each SM, embeddings of at least one or more neighbor-vertices of the destination-vertex using the subgraph; and performing, by each SM, a user-designated operation using the embeddings of the destination-vertex and the embeddings of the at least one or more neighbor-vertices.

16. The method of claim 4, further comprising, before the obtaining of the subgraph and the embedding table:

dividing each of preprocessing components comprising graph sampling, graph reindexing, embedding lookup, and data transfer to a graphic processing unit (GPU) into at least one or more subtasks per layer of the graph neural network on a host;

scheduling the at least one or more subtasks based on types and interdependencies of input and output data; and executing the at least one or more subtasks in parallel by using a plurality of threads according to the scheduling.

17. The apparatus of claim 11, further comprising:

a preprocessing scheduler configured to divide each of preprocessing components comprising graph sampling, graph reindexing, embedding lookup, and data transfer to a graphic processing unit (GPU) into at least one or more subtasks per layer of the graph neural network on a host, and to perform scheduling of the at least one or more subtasks based on types and interdependencies of input and output data; and a preprocessing circuit configured to execute the at least one or more subtasks in parallel by using a plurality of threads according to the scheduling.

* * * * *